United States Patent

Koechner

[15] 3,665,337
[45] May 23, 1972

[54] METHOD AND MEANS FOR SEALING LASER RODS

[72] Inventor: Walter Koechner, Malibu, Calif.
[73] Assignee: Union Carbide Corporation, New York, N.Y.
[22] Filed: July 17, 1970
[21] Appl. No.: 55,891

[52] U.S. Cl. .................................................. 331/94.5
[51] Int. Cl. ................................................... H01s 3/00
[58] Field of Search .................................... 331/94.5

[56] References Cited

OTHER PUBLICATIONS

Why Lasers Fail & What to Do About It; Hardaway, Microwaves Apr. 1966

Primary Examiner—Ronald L. Wibert
Assistant Examiner—Conrad Clark
Attorney—Pastoriza & Kelly

[57] ABSTRACT

A metallic film in the form of a band is provided about each end of a laser rod. These metal bands in conjunction with a specially desiged rod holder enable conventional elastomer type O-rings to be used to seal the rod in the laser head cavity. Heretofore, such O-rings could not be used because of deterioration resulting from the high intensity pump radiation within the cavity. By means of the metal bands and holder, the O-rings are shielded from such radiation.

4 Claims, 3 Drawing Figures

Patented May 23, 1972 3,665,337

INVENTOR.
WALTER KOECHNER
BY
Pastoriza & Kelly

METHOD AND MEANS FOR SEALING LASER RODS

This invention relates generally to lasers and more particularly to a novel method and means for sealing laser rods in a laser head to prevent leakage of coolant passed through the laser head.

BACKGROUND OF THE INVENTION

One of the most critical parts in any solid state laser is the seal between the laser rod and the rod holding structure within a laser head. The seal area is normally exposed to the high intensity pump radiation within the head thus eliminating the application of conventional elastomer O-rings. Such elastomer O-rings tend to deteriorate rapidly under high intensity radiation particularly in the ultraviolet range. A proper sealing is necessary to prevent leakage of coolant such as water passed through the laser head to cool the laser rod.

A variety of "all metal" seals have been used in the past and are currently being used. These seals may be provided by a shrink fit type of holder, forced fit taper type seals, special metals such as tin or indium utilized as the seal and so forth. The "all metal" seals have one disadvantage in common, to wit: they generally start to leak after a short period of time. The problems with these types of seals are mostly associated with the fact that it is not possible to keep a constant compression on the inelastic members of the seal. Any changes in the seal area, for example, caused by cold flow of material cannot be adequately compensated for. As a result, a water leak will develop.

A proposed solution to this problem is to design the rod holder in such a way that the seal area is outside the laser head or pump cavity. The seal in this case would not be exposed to pump radiation and thus a standard type elastomer O-ring can be applied. Unfortunately, this solution has severe disadvantages. First, a longer rod has to be employed which is not only more expensive, but because part of it is not pumped, there results a lossy system particularly in the case of ruby.

BRIEF DESCRIPTION OF THE PRESENT INVENTION

With the foregoing in mind, the present invention contemplates a method and means for sealing laser rods which permits the application of a standard elastomer type O-ring inside the pump cavity without risk of deterioration of the O-ring. The disadvantages mentioned heretofore of present designs are thus overcome.

In accord with the method of the invention, end portions of the laser rod are circumferentially surrounded with a light shield or other suitable materials substantially opaque to radiation in the laser head to define end bands. Standard elastomer O-rings are then engaged about the end bands and sealed to the laser head so that the O-rings are shielded from the radiation in the head by means of the end bands.

The success of this method depends on the ability to apply a metal band to a glass or crystal rod. In accord with the invention, the end bands are provided by depositing a base metal and firing the same to maturing temperature to form a thin metallic base film about the end portions of the rod. Thereafter, a metallic overcoating is electroplated or otherwise deposited on the film to a sufficient thickness to render the bands opaque to the radiation.

In the preferred apparatus of the invention, each band cooperates with a rod holder. Each rod holder is in the form of a cylindrical collar having a reduced diameter end portion craddling one side of the associated O-ring and an interior sleeve terminating against the opposite side of the O-ring. The holder itself is sealingly secured in the laser head. By this arrangement, the O-rings are protected at all times from radiation in the cavity or in the laser rod itself.

BRIEF DESCRIPTION OF THE DRAWINGS

A better understanding of the method and means of this invention will be had by referring to the accompanying drawings, in which.

DETAILED DESCRIPTION OF THE PREFERRED EMBODIMENT

Figure 1:
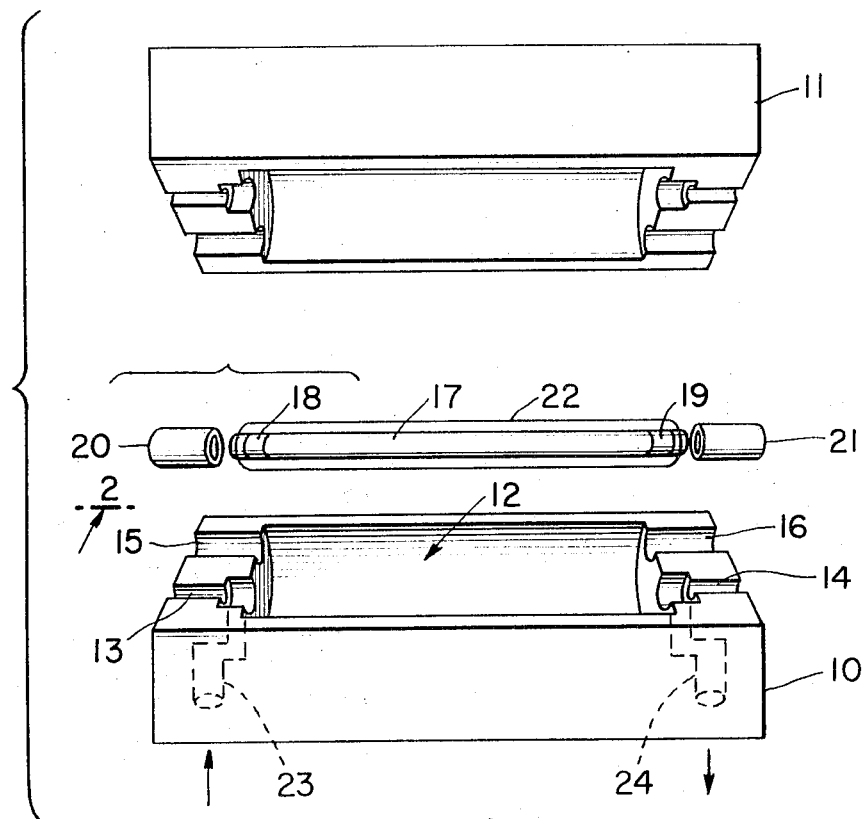
FIG. 1 is an exploded perspective view diagrammatic in form illustrating one type of laser head with which the present invention for sealing a laser rod in the head may be used.

Referring first to FIG. 1 there is shown in exploded view the base 10 and cover 11 of a laser head. These members when placed together define an interior cavity 12 of elliptical shape in cross-section. With this arrangement, a laser rod may be craddled in portions 13 and 14 such that the axis of the rod intersects one focus of the ellipse and a light pump lamp (not shown) craddled in spaced end portions 15 and 16 to intersect the other focus of the ellipse. By making the interior surface of the cavity of highly reflecting material, radiation from the lamp will be directed to the laser rod.

The laser rod itself is shown exploded above the lower base 10 as at 17. In accord with the invention, end portions of this rod are provided with cylindrical metallic bands 18 and 19 arranged to cooperate with holders 20 and 21 to secure the rod in the portions 13 and 14 of the laser head. A flow tube 22 is shown surrounding the rod 17. In the particular embodiment shown, coolant such as water may be passed up through the base of the laser head as by the passage 23, through the flow tube 22, and out the passage 24 as indicated by the two arrows. In other instances, the flow tube may not be used and the laser rod itself simply immersed entirely within coolant passing in the cavity 12.

Figure 2:
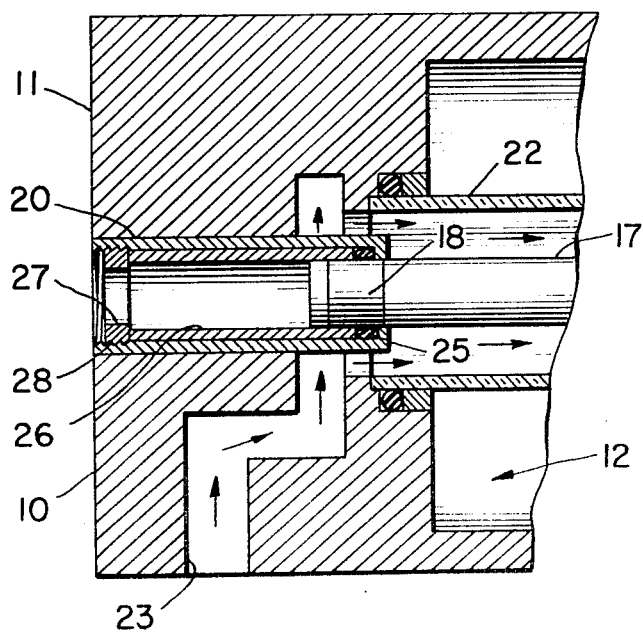
FIG. 2 is a greatly enlarged fragmentary view partly in cross-section taken in the direction of the arrow 2 of FIG. 1 when the components of FIG. 1 are in assembled relationship; and, FIG. 3 is a cross-section in greater detail of one end of the laser rod itself useful in explaining initial steps in the method.

The manner in which the laser rod is supported at each end in the cavity is identical and therefore detailed description of one such mounting will suffice for both. Thus, as shown in FIG. 2 the flow tube 22 is craddled in an inner larger diameter portion of the structure 13 of FIG. 1 in such a manner as to receive coolant through the passage 23, again as indicated by the arrow. The holder 20, in turn, takes the form of a cylindrical collar sealingly secured within the laser head, the inner end of this collar terminating in a reduced diameter portion 20' to define an annular shoulder from which the laser rod 17 extends. A conventional elastomer O-ring 25 such as rubber, silicon, neoprene or equivalent materials engages about the band 18 with one side against the inner annular shoulder defined by the reduced diameter portion 20' of the collar. A spacer or sleeve 26 extends into the collar 20 and terminates short of the shoulder to engage the other side of the O-ring 25 and thus sandwich the ring between the shoulder and the end of the sleeve. The assembly is completed by a locking ring 27 threadedly received in the outer end portion of the collar 20 as at 28.

With the foregoing arrangement, it will be evident that the metal band 18 and cooperating holder structure 20 completely shields the elastomer O-ring 25 from any radiation in the cavity or in the laser rod itself. It should be noted that a similar metallic band could be provided on the flow tube 22 in order to protect the O-ring illustrated. In the event no flow tube were used but the coolant simply passed through the entire cavity, only the laser rod would be provided with the metal band.

In order that the foregoing arrangement can be practically realized, it is essential that the metal band be properly applied to the glass or crystal rod. In accord with method steps of the present invention, a coating of platinum dispersed in an organic vehicle is applied to the rods. The material is then air dried and fired in a furnace at about 800° Centigrade. Metallic films are obtained which adhere very well to the substrate, and are resistant to high temperatures. However, such a film is so thin that it would not provide adequate light shielding. Therefor, a nickel overcoat is applied on top of the platinum film. The thickness of the nickel is typically 0.001 inch.

Figure 3:
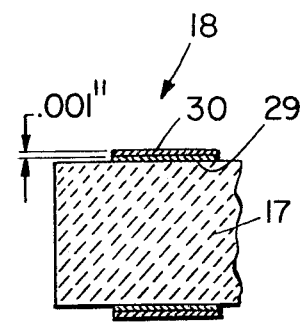

FIG. 3 illustrates in enlarged cross-section one end of the laser rod 17 upon which has been formed the metallic band 18. The platinum metallic film is shown at 29 and the nickel overcoat at 30.

The initial coating which provides the band to the laser crystal can be applied in the form of powder, paste, liquid or metallizing transfer tape. Also, a large variety of metals can be employed. All these products manufactured for example by Engelhard Industries and Vitta Corp. have in common that when the coatings are fired to maturing temperature they form thin films. After the generation of a metal film, standard electroplating either electroless or by means of electro-deposition can be applied to increase the thickness of the metal band.

While a large variety of different techniques are available, best results have been obtained by using platinum as the base material and an overcoat of nickel as described. The extremely thin platinum coating is not affected by solvents and acids applied to the part in the electroplating process. Plating with nickel provides an extremely hard overcoat which prevents any scratches and other mechanical damage of the metal band.

OPERATION

In operation, the laser head is assembled from the parts illustrated in FIG. 1 to take the assembled view as shown in FIG. 2. The O-ring 25 is tightly held between the annular end shoulder defined by the reduced diameter portion 20' of the collar 20 and the end of the sleeve 26. Coolant may pass through the passage 23 and flow tube 22 and the laser rod may be pumped and the laser operated without any fear of radiation damaging the O-ring 25. This ring, because of its resilient qualities provides a superior seal and thus the laser may be operated for long periods of time without developing any leaks. Each of the end holders is so designed as to provide an unobstructed passage for laser output light from the end of the laser.

From the foregoing description, it will be evident that the present invention has provided a greatly improved method and means for sealing laser rods wherein difficulties encountered with prior art arrangements have been overcome.

What is claimed is:

1. A means for sealing a laser rod in a laser head comprising thin metallic end bands of opaque material circumferentially surrounding in intimate contact end portions of the laser rod; elastomer O-rings engaging about said end bands; and rod holders surrounding said O-rings, each holder being sealingly secured in said laser head, whereby said metallic bands in cooperation with said rod holders completely shield said O-rings from radiation in said head.

2. A means for sealing a laser rod in a laser head cavity to prevent leakage of coolant, comprising:
   a. a thin metallic band circumferentially surrounding in intimate contact an end portion of said laser rod;
   b. a rod holder in the form of a cylindrical collar coaxially positioned over said band and having one open end of reduced internal diameter to define an annular end shoulder from which the remaining portion of said rod extends;
   c. an elastomer O-ring engaged about said band within said collar;
   d. a sleeve within said holder terminating short of said end shoulder so that said O-ring is sandwiched between the inner end of said sleeve and said end shoulder; and
   e. locking ring means in the opposite end of said collar for retaining said sleeve in said collar, said rod holder being sealingly securable in the laser head defining said cavity, said metallic band shielding said O-ring from radiation in said cavity and rod.

3. The subject matter of claim 2, including a similar means for sealing the opposite end of said laser rod in said laser head 4. The subject matter of claim 2, in which said metallic band comprises a base film of platinum covered by an overcoating of nickel.

* * * * *